United States Patent [19]

Matsumoto et al.

[11] Patent Number: 5,218,014

[45] Date of Patent: Jun. 8, 1993

[54] THERMOPLASTIC RESIN AND PROCESS FOR REDUCING THE SAME

[75] Inventors: Makoto Matsumoto; Junichiro Watanabe; Takashi Kurata; Noriaki Ijuin; Tateki Furuyama, all of Tokyo, Japan

[73] Assignees: Toshiba Silicone Co., Ltd.; Japan Synthetic Rubber Co., Ltd., both of Tokyo, Japan

[21] Appl. No.: 627,815

[22] Filed: Dec. 14, 1990

[30] Foreign Application Priority Data

Dec. 18, 1989 [JP] Japan ................................ 1-327687
Aug. 31, 1990 [JP] Japan ................................ 2-229798

[51] Int. Cl.$^5$ .......................... C08K 9/06; C08K 3/36
[52] U.S. Cl. ..................................... 523/209; 523/205; 523/212; 523/213; 523/214; 524/837; 525/254
[58] Field of Search ............... 523/209, 212, 213, 214, 523/205

[56] References Cited

U.S. PATENT DOCUMENTS

| | | | |
|---|---|---|---|
| 3,079,361 | 2/1963 | Pluddemann | 523/212 |
| 3,249,464 | 5/1966 | Nelson et al. | 523/212 |
| 3,419,517 | 12/1968 | Hedrick et al. | 523/213 |
| 5,064,894 | 11/1991 | Desmonceau et al. | 524/503 |

FOREIGN PATENT DOCUMENTS 0206525 12/1986 European Pat. Off. .
0316855 5/1989 European Pat. Off. .

OTHER PUBLICATIONS

*Database WPIL*, 90-026251, & JP-A-1304104, Dec. 7, 1989, "Fill Reinforced Water Swelling Gel Produce Comprise Add Silicon Based Compound Solution Inorganic Solution Add Olefinic Monomer Catalyst Polymerise".

*Database WPIL*, 89-037244, & JP-A-63312311, Dec. 20, 1988, "Methacrylic Resin Mould Article Comprise Hydrolysis Acryloxy Group Contain Alkoxy Silane Silica Sol Crosslink Gel Polymer Base Material".

*Primary Examiner*—Paul R. Michl
*Assistant Examiner*—Andrew E. C. Merriam
*Attorney, Agent, or Firm*—Oblon, Spivak, McClelland, Maier & Neustadt

[57] ABSTRACT

A thermoplastic resin containing a graft copolymer obtained by graft-copolymerizing at least one vinyl monomer onto colloidal silica-core silicone-shell particles, and a process for producing the thermoplastic resin.

A colloidal silica-core silicone-shell particles comprising (A) from 99.9 to 5% by weight of cores which are colloidal silica particles, and
(B) from 0.1 to 95% by weight of shells comprising an organosiloxy group represented by the formula $$R^1_p(QO)_q SiO_{\frac{4-p-q}{2}}- \qquad (I)$$

wherein $R^1$ which may be the same or different each represents a substituted or unsubstituted monovalent hydrocarbon group having 1 to 8 carbon atoms, Q represents hydrogen atom or an alkyl group having 1 to 6 carbon atoms, p is an integer of 1 to 3, and q is an integer of 0 to 2, with proviso that (p+q) is an integer of 1 to 3, and/or a polyorganosiloxane represented by the average composition formula $$R^2_a SiO_{\frac{4-a}{2}} \qquad (II)$$

wherein $R^2$ which may be the same or different each represents a substituted or unsubstituted monovalent hydrocarbon group having 1 to 8 carbon atoms and a is a number of 0.8 to 3.0, wherein 0.02 to 100 mole % of the sum of $R^1$ and $R^2$ are groups containing a reactive unsaturated group.

6 Claims, No Drawings

THERMOPLASTIC RESIN AND PROCESS FOR REDUCING THE SAME

FIELD OF THE INVENTION

The present invention relates to a thermoplastic resin having excellent impact resistance, wear resistance, weatherability, and other properties, which contains a copolymer obtained by graft-polymerizing a vinyl monomer onto colloidal silica-core silicone-shell particles comprising colloidal silica particles and a reactive unsaturated group-containing polyorganosiloxane bonded to the silica particles through siloxane bond, and also relates to a process for producing the thermoplastic resin.

BACKGROUND OF THE INVENTION

It is known that colloidal silica is added to water-based resin coating compositions for the purpose of modifying or improving the performance of films formed from the water-based resin coating compositions which are attracting attention from the standpoints of preventing environmental pollution and ensuring safe and hygienic working atmospheres. However, there is a disadvantage that the bonding between the colloidal silica particles added and the organic polymer emulsion is weak and, as a result, the resulting coating films have poor durability. It has therefore been extensively attempted in the field of coating compositions to improve the interfacial adhesion by grafting an organic polymer onto colloidal silica particles.

For example, JP-B-62-58630 (the term "JP-B" as used herein means an "examined Japanese patent publication") discloses a surface-treating agent for metals which is obtained by adding a colloidal silica and a chromium compound to an acrylic resin obtained by the multi-stage emulsion polymerization of an organosilicon compound having both a reactive unsaturated group and an alkoxy group with acrylic monomers. The surface-treating agent gives coatings which impart good corrosion resistance and coating suitability to the metal surface and have excellent adhesion, deep draw processing properties, and anti-block properties.

This surface-treating agent, however, has the following disadvantage. During the process for producing the acrylic resin, alkoxy groups are hydrolyzed into silanol groups, which in some cases form siloxane bonds (—SiOSi—) through subsequent condensation reactions. That is, the siloxane bonds are unevenly distributed in the molecules of the acrylic resin produced, although it is desirable that the portions which can exert an interaction with colloidal silica particles added be evenly distributed in the acrylic resin to improve the interfacial adhesion between the silica particles and the resin. The uneven distribution of siloxane bonds in the molecules results in that siloxane bonds do not present over the whole interfaces between the acrylic resin and colloidal silica particles added. Therefore, sufficient interfacial adhesion cannot be obtained.

JP-A-59-71316 (the term "JP-A" as used herein means an "unexamined published Japanese patent application") discloses an aqueous resin dispersion which is obtained by emulsion-copolymerizing an acrylic monomer, a styrenic monomer, and an organosilicon compound having both a reactive unsaturated group and an alkoxy group in an aqueous medium in the presence of a colloidal silica. The aqueous resin dispersion can form films having excellent durability and good resistance to stains.

JP-A-61-155474 discloses an aqueous coating composition in which an aqueous resin dispersion obtained by emulsion-polymerizing an acrylic monomer and an organosilicon compound having both a reactive unsaturated group and an alkoxy group in the presence of a colloidal silica and a water-soluble or water-dispersible acrylic copolymer having an alkoxysilyl group are contained as binder components. The aqueous resin dispersion gives films having durability, flame retardant properties, resistance to stains, dew condensation-preventing properties, and other properties.

However, both of the above two proposals have the following disadvantage. Since in either case the emulsion copolymerization of an organosilicon compound with organic monomers is conducted in the presence of a colloidal silica, the radical copolymerization at olefin moieties, the condensation reaction of alkoxysilyl groups with Si—OH groups on the surfaces of colloidal silica particles, and the condensation reaction among alkoxysilyl groups proceed simultaneously. For this reason, it is difficult to complete the desired condensation reaction of alkoxysilyl groups with Si—OH groups on the surfaces of silica particles. Further, part of the colloidal silica particles do not take part in this condensation reaction. Hence, the interfacial adhesion between the organic polymer and the colloidal silica particles cannot be increased to a sufficient level. It may, therefore, be thought that the above two proposals can be made more effective if the emulsion polymerization is conducted in two stages in a manner such that siloxy groups containing a highly radical-copolymerizable, reactive unsaturated group are first incorporated into the surfaces of colloidal silica particles, and then an organic monomer is copolymerized therewith. However, such a process has not been studied to present.

Recently, as one approach to develop highly functional polymer materials, modification of organic polymers with silicones is attempted to impart to the organic polymers the heat resistance, cold resistance, weathering resistance, flame retardant properties, and other excellent properties possessed by the silicones. However, since the silicone is a specific polymer having a siloxane skeleton and, hence, has poor compatibility with ordinary polymers having carbon skeleton, compositions obtained by merely blending silicones with ordinary organic polymers cannot satisfactorily retain the desired properties of the silicones. It is, therefore, necessary to chemically bond a siloxane skeleton to a carbon skeleton by grafting or other means.

As such a technique, polymerization of a vinyl monomer in the presence of a polyorganosiloxane containing a vinyl or allyl group is disclosed in, for example, JP-A-50-109282. This polymerization gives a graft copolymer, thus imparting improved impact strength to the resulting resin. Furthermore, JP-A-60-252613, JP-A-61-106614, and JP-A-61-136510 propose to obtain a graft copolymer having a high degree of grafting and excellent impact strength by polymerizing a vinyl monomer in an emulsion of a polyorganosiloxane containing an acryl or methacryl group.

However, the graft copolymers obtained by the above methods are defective in that their mechanical properties such as impact resistance have not been improved sufficiently because polyorganosiloxanes alone which do not have sufficient strength are used as the rubber component. For the purpose of improving the mechanical properties of such polyorganosiloxanes, a combined use of a tri- or tetrafunctional crosslinking agent such as an alkyltrialkoxysilane, tetraalkoxysilane, etc., has been attempted to improve the strength, but attainable improvement in strength is limited and a satisfactory polyorganosiloxane has not yet been obtained.

One possible approach to overcome the problems accompanying the attempts to modify or improve ordinary organic resins using silicone or adding a reinforcing material such as colloidal silica is to incorporate a reinforcing material such as silica into domains of a polyorganosiloxane. As a result of the incorporation of such a reinforcing material into polyorganosiloxane domains, not only the mechanical properties of the resulting graft copolymer are improved, but also new properties are expected to be imparted to the graft copolymer. However, in order to realize the above approach, a silicone emulsion in which a polyorganosiloxane and a silica particle are contained in the same micelle is required, and preferably an emulsion of colloidal silica-core silicone-shell particles each of which comprises a core which is a colloidal silica particle and a polyorganosiloxane shell covering the core through siloxane bonds is desired.

Although no literature has so far been found which reports or proposes a process clearly intended for the preparation of the above-described core-shell particles, there are some literature references disclosing processes which may form such core-shell particles. For example, JP-A-61-16929, JP-A-61-271352, and JP-A-61-272264 disclose a process for obtaining an aqueous emulsion of a silicone reinforced with colloidal silica particles, in which hydroxyl-terminated polyorganosiloxane is condensed using a sulfonic acid-type emulsifying agent in the presence of an acid colloidal silica. However, since the polysiloxane used as a raw material has a relatively high degree of polymerization, it is extremely difficult for the initial homogenizing step to include the polysiloxane and a colloidal silica particle in the same micelle and, as a result, the above process necessarily yields an emulsion containing not only the desired core-shell particles but also those colloidal silica particles and polyorganosiloxane which have not participated in the polycondensation. Therefore, even if this method is applied to the above-described process for producing a graft copolymer, it is difficult to exhibit the effect by the addition of colloidal silica.

JP-A-1-234468 discloses a reactive microgel composition which is obtained by mixing an organosilane compound having a polymerizable unsaturated double bond and an alkoxy group and, if necessary, other alkoxysilanes with a silica sol, and then subjecting the resulting mixture to hydrolysis. The reactive microgel composition cures upon exposure to irradiation or heat to give a film having excellent film properties. However, this composition cannot impart to organic polymers the heat resistance, cold resistance, weathering resistance, and other properties possessed by silicone resins, and is not intended for use in such a purpose. The above reference also does not suggest such use of the composition.

SUMMARY OF THE INVENTION

As a result of intensive studies to overcome the above problems, it has now been found that a thermoplastic resin having extremely good impact resistance, wear resistance, weatherability, and other properties can be obtained by first forming colloidal silica-core silicone-shell particles and then graft-polymerizing a vinyl monomer onto the core-shell particles.

Accordingly, an object of the present invention is to provide a thermoplastic resin containing a copolymer obtained by graft-polymerizing a vinyl monomer onto colloidal silica-core silicone-shell particle.

Another object of the present invention is to provide a process for producing the thermoplastic resin.

The thermoplastic resin in accordance with the present invention contains a graft copolymer obtained by graft-polymerizing at least one vinyl monomer onto silica-core silicone-shell particles comprising (A) from 99.9 to 5% by weight of cores which are colloidal silica particles, and (B) from 0.1 to 95% by weight of a shell comprising an organosiloxy group represented by the formula

     (I)

wherein $R^1$ which may be the same or different each represents a substituted or unsubstituted monovalent hydrocarbon group having 1 to 8 carbon atoms, Q represents hydrogen atom or an alkyl group having 1 to 6 carbon atoms, p is an integer of 1 to 3, and q is an integer of 0 to 2, with proviso that (p+q) is an integer of 1 to 3, and/or a polyorganosiloxane represented by the average composition formula

     (II)

wherein $R^2$ which may be the same or different each represents a substituted or unsubstituted monovalent hydrocarbon group having 1 to 8 carbon atoms and a is a number of 0.8 to 3.0, wherein 0.02 to 100 mol % of the sum of $R^1$ and $R^2$ are groups containing a reactive unsaturated group.

The process for producing the above thermoplastic resin in accordance with the present invention comprises graft-polymerizing at least one vinyl monomer onto silica-core silicone-shell particles comprising (A) from 99.9 to 5% by weight of cores which are colloidal silica particles, and (B) from 0.1 to 95% by weight of a shell comprising an organosiloxy group represented by the formula

     (I)

wherein $R^1$ which may be the same or different each represents a substituted or unsubstituted monovalent hydrocarbon group having 1 to 8 carbon atoms, Q represents hydrogen atom or an alkyl group having 1 to 6 carbon atoms, p is an integer of 1 to 3, and q is an integer of 0 to 2, with proviso that (p+q) is an integer of 1 to 3, and/or a polyorganosiloxane represented by the average composition formula

     (II)

wherein $R^2$ wherein $R^2$ which may be the same or different each represents a substituted or unsubstituted monovalent hydrocarbon group having 1 to 8 carbon atoms and a is a number of 0.8 to 3.0, wherein 0.02 to 100 mole % of the sum of $R^1$ and $R^2$ are groups containing a reactive unsaturated group, in an emulsion containing the core-shell particles.

DETAILED DESCRIPTION OF THE INVENTION

The colloidal silica particles used as component (A) in the core-shell particles used in the present invention mean a dispersion in water of silica particles comprising $SiO_2$ as a basic unit. Silica particles having an average particle diameter of 4 to 400 nm, preferably 30 to 150 nm, are suitable for use in the present invention. Although there are two types of such colloidal silica from their characteristics, i.e., the acidic type and alkaline type, a suitable type can be selected according to the conditions for emulsion polymerization.

The shells which are the other component, component (B), of the colloidal silica-core silicone-shell particles used in the present invention are composed of the organosiloxy group and/or polyorganosiloxane described above. In component (B), it is preferred that 0.02 to 100 mole % of the sum of $R^1$ and $R^2$ are groups containing a reactive unsaturated group.

The shell is preferably a polyorganosilaxane comprising a hydrolyzate or condensate of an organosilicon compound (a) represented by the formula

$$R^3{}_bSi(OR^4)_{4-b} \qquad (III)$$

wherein $R^3$ which may be the same or different each represents a substituted or unsubstituted monovalent hydrocarbon group having 1 to 8 carbon atoms, $R^4$ represents an alkyl group having 1 to 6 carbon atoms, and b is an integer of 1 to 3, and/or a polycondensate of the organosilicon compound (a) and a polyorganosiloxane having 2 to 10 silicon atoms and not having a hydroxyl group, containing a structural unit represented by the average composition formula $$R^5{}_cSiO_{\frac{4-c}{2}} \qquad (IV)$$

wherein $R^5$ which may be the same or different each represents a substituted or unsubstituted monovalent hydrocarbon group, and c is a number of 0.8 to 3.0, wherein 0.02 to 100 mole % of the sum of $R^3$ and $R^5$ are groups containing a reactive unsaturated group.

Examples of the reactive unsaturated group include the following groups.

$$CH_2=CH-O-(CH_2)_n- \qquad (V)$$

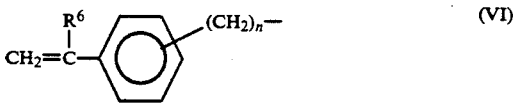
(VI)

(VII)

Other examples of reactive unsaturated group-containing groups are represented by the general formula $$CH_2=CH-(CH_2)_n- \qquad (VIII)$$

wherein n is an integer of 0 to 10.

Specific examples of the reactive unsaturated group-containing groups represented by the formula (V) above include vinyloxypropyl group, vinyloxyethoxypropyl group, vinyloxyethyl group, vinyloxyethoxyethyl group, and the like. Of these, vinyloxypropyl group and vinyloxyethoxypropyl group are preferred.

In the case where the reactive unsaturated group is an ethylenically unsaturated group represented by the above formula (VI), $R^6$ represents hydrogen atom or an alkyl group having 1 to 6 carbon atoms, preferably hydrogen atom or an alkyl group having 1 or 2 carbon atoms, more preferably hydrogen atom or methyl group. Examples of the group represented by this formula (VI) include vinylphenyl group, isopropenylphenyl group, and the like. Specific examples of groups containing the ethylenically unsaturated group represented by the formula (VI) include vinylphenyl group, 1-(vinylphenyl)ethyl group, 2-(vinylphenyl)ethyl group, (vinylphenyl)methyl group, isopropenylphenyl group, 2-(vinylphenoxy)ethyl group, 3-(vinylbenzoyloxy)propyl group, 3-(isopropenylbenzoylamino)propyl group, and the like. Of these, vinylphenyl group, 2-(vinylphenyl)ethyl group, and 1-(vinylphenyl)ethyl group are preferred.

In the case where the reactive unsaturated group is an ethylenically unsaturated group represented by the above formula (VII), $R^7$ represents hydrogen atom or methyl group and $R^8$ represents an alkylene group having 1 to 6 carbon atoms, —O—, —S—, or a group of the formula

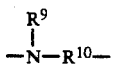
$$\begin{array}{c} R^9 \\ | \\ -N-R^{10}- \end{array}$$

wherein $R^9$ represents a monovalent hydrocarbon group having 1 to 6 carbon atoms or (meth)acryloyl group, and $R^{10}$ represents an alkylene group having 1 to 6 carbon atoms. Specific examples of groups containing the ethylenically unsaturated group represented by the formula (VII) include γ-acryloxypropyl group, γ-methacryloxypropyl group, N-methacryloyl-N-methyl-γ-aminopropyl group, N-methacryloyl-N-methyl-γ-aminopropyl group, N-acryloyl-N-methyl-γ-aminopropyl group, N,N-bis(methacryloyl)-γ-aminopropyl group, and the like. Preferred of these are N-methacryloyl-N-methyl-γ-aminopropyl group and N-acryloyl-N-methyl-γ-aminopropyl group.

In the case where the reactive unsaturated group is an ethylenically unsaturated group-containing group represented by the above formula (VIII), n is an integer of 0 to 10. Specific examples of the ethylenically unsaturated group-containing group represented by the formula (VIII) include vinyl group, allyl group, homoallyl (3-butenyl) group, 5-hexenyl group, 7-octenyl group, and the like. Of these, vinyl group and allyl group are preferred.

If the amount of silicon-bonded organic groups containing such a reactive unsaturated group is below 0.02 mol % of the total amount of the silicon-bonded organic groups, a high graft ratio cannot be obtained in graft polymerization of the resulting silica-core silicone-shell particles with an organic monomer.

The colloidal silica-core silicone-shell particles used in the present invention can be obtained by subjecting the above-described colloidal silica, i.e., component (A), and either the organosilicon compound (a) of the formula (III) alone or a combination of the organosilicon compound (a) and the organosiloxane (b) of the formula (IV), as component (B), to polycondensation in an aqueous medium in the presence of an effective amount of an emulsifying agent or an emulsifying agent mixture.

The organosilicon compound (a) used as part or all of component (B) in the present invention contains both a reactive unsaturated group as described above and an alkoxy group. Examples of this organosilicon compound include silane compounds such as (vinyloxypropyl)methyldimethoxysilane, (vinyloxyethoxypropyl)methyldimethoxysilane, p-vinylphenylmethyldimethoxysilane, 1-(m-vinylphenyl)methyldimethylisopropoxysilane, 2-(p-vinylphenyl)ethylmethyldimethoxysilane, 3-(p-vinylphenoxy)propyltriethoxysilane, 3-(p-vinylbenzoyloxy)propylmethyldimethoxysilane, 1-(p-vinylphenyl)ethylmethyldimethoxysilane, 1-(o-vinylphenyl)-1,1,2-trimethyl-2,2-dimethoxydisilane, 1-(p-vinylphenyl)-1,1-diphenyl-3-ethyl-3,3-diethoxydisiloxane, m-vinylphenyl-[3-(triethoxysilyl)propyl]diphenylsilane, [3-(p-isopropenylbenzoylamino)propyl]phenyldipropoxysilane, γ-acryloxypropylmethyldiethoxysilane, γ-methacryloxypropylmethyldimethoxysilane, γ-methacryloxypropyltrimethoxysilane, N-methacryloyl-N-methyl-γ-aminopropylmethyldimethoxysilane, N,N-bis(methacryloyl)-γ-aminopropylmethyldimethoxysilane, N,N-bis(acryloyl)-γ-aminopropylmethyldimethoxysilane, N-methacryloyl-N-methyl-γ-aminopropylphenyldiethoxysilane, 1-methacryloxypropyl-1,1,3-trimethyl-3,3-dimethoxydisiloxane, vinylmethyldimethoxysilane, vinylethyldiisopropoxysilane, vinyldimethylethoxysilane, allylmethyldimethoxysilane, 5-hexenylmethyldiethoxysilane, and γ-octenylethyldiethoxysilane. These can used alone or as a mixture of two or more thereof.

Preferred of the above examples of the organosilicon compound are (vinyloxypropyl)methyldimethoxysilane, (vinyloxyethoxypropyl)methyldimethoxysilane, p-vinylphenylmethyldimethoxsilane, 2-(p-vinylphenyl)ethylmethyldimethoxysilane, 3-(p-vinylbenzoyloxy)propylmethyldimethoxysilane, 1-(p-vinylphenyl)ethylmethyldimethoxysilane, γ-methacryloxy-propylmethyldimethoxysilane, N-methacryloyl-N-methyl-γ-aminopropylmethyldimethoxysilane, N-acryloyl-N-methyl-γ-aminopropylmethyldimethoxysilane, vinylmethyldimethoxysilane, and allylmethyldimethoxysilane. More preferred of these are p-vinylphenylmethyldimethoxysilane, γ-methacryloxypropyl-methyldimethoxysilane, N-methacryloyl-N-methyl-γ-aminopropylmethyldimethoxysilane, and vinylmethyldimethoxysilane.

The organosiloxane (b) which is used to form the shell portion, component (B), in the present invention contain constituent units represented by the above formula (II), contain no hydroxyl group, and have 2 to 10 silicon atoms. The structure of the organosiloxane (b) is not particularly limited and may be straight-chain, branched, or cyclic, but the organosiloxane having a cyclic structure is preferred. An organosiloxane having more than 10 silicon atoms is disadvantageous in that when emulsion polymerization of this organosiloxane is conducted, it is difficult to incorporate colloidal silica particles into organosiloxane micelles and, hence, part of the colloidal silica particles used do not take part in the formation of core-shell particles. As a result, an emulsion is obtained which contains free colloidal silica particles and polyorganosiloxane micelles in addition to the desired core-shell particles. Further, use of a hydroxyl group-containing organosiloxane should be avoided since such an organosiloxane undergoes a polycondensation reaction in the initial stage of emulsification to yield an organosiloxane having more than 10 silicon atoms, which causes the same problem as described above.

Examples of the substituted or unsubstituted monovalent hydrocarbon group contained in the organosiloxane (b) which can be used as part of component (B) include methyl group, ethyl group, propyl group, vinyl group, phenyl group, and those groups substituted with a halogen atom or cyano group. Examples of the reactive unsaturated group contained in the organosiloxane (b) include the same reactive unsaturated groups as described above.

Examples of the organosiloxane (b) which can be used as part of component (B) include hexamethylcyclotrisiloxane, octamethylcyclotetrasiloxane, decamethylcyclopentasiloxane, dodecamethylcyclohexasiloxane, 1,3,5-trimethyl-1,3,5-triphenylcyclotrisiloxane, tris(3,3,3-trifluoropropyl)trimethylcyclotrisiloxane, 1,3,5,7-tetra(vinyloxypropyl)-tetramethylcyclotetrasiloxane, 1,3,5,7-tetra(vinyloxyethoxypropyl)tetramethylcyclotetrasiloxane, 1,3,5,7-tetra(p-vinylphenyl)tetramethylcyclotetrasiloxane, 1,3,5,7-tetra[1-(m-vinylphenyl)methyl]tetramethylcyclotetrasiloxane, 1,3,5,7-tetra[2-(p-vinylphenyl)ethyl]tetramethylcyclotetrasiloxane, 1,3,5,7-tetra[3-(p-vinylphenoxy)propyl]tetramethylcyclotetrasiloxane, 1,3,5,7-tetra[3-(p-vinylbenzoyloxy)propyl]tetramethylcyclotetrasiloxane, 1,3,5,7-tetra[3-(p-isopropenylbenzoylamino)propyl] tetramethylcyclotetrasiloxane, 1,3,5,7-tetra(γ-acryloxypropyl)-tetramethylcyclotetrasiloxane, 1,3,5,7-tetra(γ-methacryloxypropyl)tetramethylcyclotetrasiloxane, 1,3,5,7-tetra(N-methacryloyl-N-methyl-γ-aminopropyl)tetramethylcyclotetrasiloxane, 1,3,5,7-tetra(N-acryloyl-N-methyl-γ-aminopropyl)tetramethylcyclotetrasiloxane, 1,3,5,7-tetra[N,N-bis(methacryloyl)-γ-aminopropyl]tetramethylcyclotetrasiloxane, 1,3,5,7-tetra[N,N-bis(acryloyl)-γ-aminopropyl]tetramethylcyclotetrasiloxane, 1,3,5,7-tetravinyltetramethylcyclotetrasiloxane, octavinylcyclotetrasiloxane, 1,3,5-trivinyltrimethylcyclotrisiloxane, 1,3,5,7-tetraallyltetramethylcyclotetrasiloxane, 1,3,5,7-tetra(5-hexenyl)tetramethylcyclotetrasiloxane, 1,3,5,7-tetra(7-octenyl)tetramethylcyclotetrasiloxane, and the like. These can be used alone or as a mixture of two or more thereof. In addition to the above examples, other straight-chain or branched organosiloxanes can be used. However, if a straight-chain or branched organosiloxane is used, the organosiloxane in which the terminals of the molecular chain have been blocked with a substituent other than hydroxyl, such as an alkoxy group, trimethylsilyl group, dimethylvinylsilyl group, methylphenylvinylsilyl group, methyldiphenylsilyl group, 3,3,3-trifluoropropyldimethylsilyl group, or the like is preferably used.

The above-described organosilicon compound (a) alone or a combination of the organosilicon compound (a) and the above-described component (b) are suitably selected as component (B) such that the resulting colloidal silica-core silicone-shell particles used in the present invention have a silicone shell content of from 0.1 to 95% by weight and that from 0.02 to 100 mol % per mole of all the silicon-bonded organic groups in the silicone shells are groups containing a reactive unsaturated group. For example, from 99.9 to 5% by weight of a colloidal silica, component (A), is blended with 0.1 to 95% by weight of component (B) which is either the organosilicon compound (a) alone or a combination of the organosilicon compound (a) and the organosiloxane (b) [provided that the sum of component (A) and component (B), i.e., (A)+((a)+(b)), is 100% by weight].

The colloidal silica-core silicone-shell particles used in the present invention can be obtained by mixing, with shearing, the above-described colloidal silica, i.e., component (A), with component (B) which is either the organosilicon compound (a) alone or a combination of the organosilicon compound (a) and the organosiloxane (b) in an aqueous medium in the presence of an emulsifying agent by means of a homogenizer or other device, and then allowing the resulting mixture to undergo condensation.

The emulsifying agent mainly functions as a surfactant for emulsifying ingredient (B), i.e., the organosilicon compound (a) alone or a combination of the organosilicon compound (a) and the organosiloxane (b), and at the same time, also functions as a catalyst for the polycondensation reactions of component (A) and component (B). The emulsifying agent may be anionic type or cationic type.

Examples of the anionic emulsifying agent include aliphatic-substituted benzenesulfonic acids in which the aliphatic substituent has a carbon chain having 6 to 18 carbon atoms, aliphatic-substituted naphthalenesulfonic acids, aliphatic sulfonic acids, silylalkylsulfonic acids, aliphatic-substituted (diphenyl ether)sulfonic acids, and the like. Of these, aliphatic-substituted benzenesulfonic acids are preferred.

Examples of the cationic emulsifying agent include quaternary ammonium salt-type surface active agents such as alkyltrimethylammonium salts (e.g., octadecyltrimethylammonium chloride and hexadecyltrimethylammonium chloride), dialkyldimethylammoniumsalts (e.g., dioctadecyldimethylammoniumchloride, dihexadecyldimethylammonium chloride,and didodecyldimethylammonium chloride), and benzalkonium chloride-type compounds (e.g., octadecyldimethylbenzylammonium chloride and hexadecyldimethylbenzylammonium chloride), and others. However, since some kinds of the above quaternary ammonium salt-type surfactants show low catalytic activity, addition of an alkali catalyst such as sodium hydroxide or potassium hydroxide is required in such a case.

The amount of the above-described emulsifying agent used is generally from 0.1 to 5 parts by weight, preferably from about 0.3 to 3 parts by weight, per 100 parts by weight of the sum of component (A) and component (B). If required and necessary, a nonionic emulsifying agent may also be used in combination with the anionic or cationic emulsifying agent.

In the production of colloidal silica-core silicone-shell particles in accordance with the present invention, an acidic colloidal silica should be used when an anionic emulsifying agent is used, while an alkaline colloidal silica should be used when a cationic emulsifying agent is used, for the purpose of maintaining the colloidal silica in a stable state.

The amount of water used in the production of the colloidal silica-core silicone-shell particles is generally from 100 to 500 parts by weight, preferably from 200 to 400 parts by weight, per 100 parts by weight of the sum of component (A) and component (B). The temperature for the condensation is generally from 5° to 100° C. In conducting the process for producing the colloidal silica-core silicone-shell particles, a crosslinking agent can be added as an optional ingredient in order to improve the strength of the silicone shell portion.

Examples of the crosslinking agent include trifunctional crosslinking agents such as methyltrimethoxysilane, phenyltrimethoxysilane, ethyltriethoxysilane, and (3,3,3-trifluoropropyl)trimethoxysilane, tetrafunctional crosslinking agents such as tetraethoxysilane, and the like. The amount of the crosslinking agent added is generally about 10% by weight or less, preferably about 5% by weight or less, based on the total weight of component (B).

The thus-obtained emulsion of colloidal silica-core silicone-shell particles is acidic or alkaline depending on the emulsion polymerization conditions. Therefore, this emulsion, if required, can be neutralized with an alkali or acid. Example of the alkali include sodium hydroxide, potassium hydroxide, sodium carbonate, sodium hydrogen carbonate, triethanolamine, triethylamine, or the like. Examples of the acid include, hydrochloric acid, sulfuric acid, nitric acid, acetic acid, oxalic acid, or the like. The colloidal silica-core silicone-shell particles thus obtained generally have an average particle diameter of from 4 to 400 nm. By conducting the polymerization of such an organic monomer as described below in an emulsion of the colloidal silica-core silicone-shell particles having such an average particle diameter, the core-shell particles easily participate in graft polymerization, thus contributing to the synthesis of a reinforced polymer.

That is, a graft copolymer which is contained in the thermoplastic resin of the present invention can be obtained by graft-polymerizing a vinyl monomer onto the above-obtained colloidal silica-core silicone-shell particles in an emulsion of the particles.

Examples of the vinyl monomer used in the present invention include aromatic alkenyl compounds such as styrene, α-methylstyrene, dichlorostyrene, dibromostyrene, and sodium styrenesulfonate; methacrylates such as methyl methacrylate, ethyl methacrylate, 2-ethylhexyl methacrylate, butyl methacrylate, and allyl methacrylate; acrylates such as methyl acrylate, ethyl acrylate, butyl acrylate, hydroxyethyl acrylate, and dimethylaminoethyl acrylate; vinyl cyanide compounds such as acrylonitrile and methacrylonitrile; olefins such as ethylene and propylene; conjugated diolefins such as butadiene, isoprene, and chloroprene; and other vinyl compounds including vinyl acetate, vinyl chloride, vinylidene chloride, vinylidene fluoride, tetrafluoroethylene, hexafluoropropylene, triallyl isocyanurate, acrylic acid, methacrylic acid, N-phenylmaleimide, N-cyclohexylmaleimide, maleic anhydride, and the like. These can be used alone or as a mixture of two or more thereof.

From the standpoint of imparting further improved impact resistance to the thermoplastic resin of the present invention, it is preferred that the vinyl monomer used contains from 65 to 75% by weight of styrene and from 35 to 25% by weight of acrylonitrile.

In the graft polymerization of the vinyl monomer with the colloidal silica-core silicone-shell particles, the core-shell particles, ingredient (i), is introduced in a reactor in an amount of generally from 1 to 90% by weight, preferably from 5 to 80% by weight, and the vinyl monomer, ingredient (ii), is introduced in an amount of generally from 99 to 10% by weight, preferably from 95 to 20% by weight, based on the total amount of ingredients (i) and (ii). If the amount of ingredient (i) is below 1% by weight, the effect of improving impact strength, wear resistance, etc., cannot be obtained. On the other hand, if the amount of ingredient (i)

exceeds 90% by weight, the proportion of the vinyl polymer grafted onto the core-shell particles in the resulting graft copolymer becomes too small and, as a result, sufficient interfacial adhesion cannot be obtained between the colloidal silica-core silicone-shell particles and the vinyl polymer, and the final thermoplastic resin has poor strength.

The thus-obtained graft copolymer has a graft ratio of generally about 5% by weight or higher, preferably about 10% by weight or higher, more preferably about 20% by weight or higher. Such a high graft ratio of the graft copolymer brings about enhanced adhesion between the graft copolymer and the vinyl polymer which has not directly grafted, and also enables the colloidal silica-core silicone-shell particles to uniformly disperse in the vinyl polymer, thus providing excellent strength, weatherability, appearance, etc.

The thermoplastic resin of the present invention contains an ungrafted vinyl polymer besides the graft copolymer obtained as described above. Generally, however, the content of the graft copolymer in the thermoplastic resin is 5% by weight or more, preferably 10% by weight or more.

In producing the thermoplastic resin of the present invention, the vinyl monomer is graft-polymerized onto the colloidal silica-core silicone-shell particles by the conventional radical polymerization, thereby obtaining a composition containing a graft copolymer.

Examples of the free-radical initiators which can be used for the above radical polymerization include redox-type initiators comprising combinations of oxidizing agents comprising organic hydroperoxides such as cumene hydroperoxide, diisopropylbenzene hydroperoxide, and p-menthane hydroperoxide with reducing agents such as a saccharated iron pyrophosphate formulation, a sulfoxylate formulation, and a mixture of a saccharated iron pyrophosphate formulation and a sulfoxylate formulation; persulfates such as potassium persulfate and ammonium persulfate; azo compounds such as azobisisobutyronitrile,dimethyl-2,2,-azobisisobutyrate,and2-carbamoylazaisobutyronitrile; and organic peroxides such as benzoyl peroxide and lauroyl peroxide. Preferred of these are redox-type initiators.

The free-radical initiator is used in an amount of generally from about 0.05 to 5 parts by weight, preferably from about 0.1 to 3 parts by weight, per 100 parts by weight of the vinyl monomer used. It is preferred that this radical polymerization process be conducted by means of emulsion polymerization.

For the emulsion polymerization, conventional emulsifying agents, the free-radical initiators described above, conventional chain transfer agents, etc., can be used.

Examples of the emulsifying agents include anionic emulsifying agents such as sodium dodecylbenzenesulfonate, sodium lauryl sulfate, sodium (diphenyl ether)disulfonate, and sodium (dialkali succinate)sulfonate; and nonionic emulsifying agents such as polyoxyethylene alkyl esters and polyoxyethylene alkylallyl ethers. These can be used alone or in combination of two or more thereof. The amount of the emulsifying agent used is generally from about 0.5 to 5% by weight based on the weight of the vinyl monomer.

Examples of the chain transfer agents include mercaptans such as t-dodecyl mercaptan, octyl mercaptan, n-tetradecyl mercaptan, and n-hexyl mercaptan; and halogen compounds such as carbon tetrachloride and ethylene bromide. The chain transfer agent is generally used in an amount of from 0.02 to 1% by weight based on the weight of the vinyl monomer.

If required and necessary, various electrolytes, pH regulators, and other additives may be used for the emulsion polymerization along with the free-radical initiator, emulsifying agent, and chain transfer agent. The emulsion polymerization is conducted using the above-described free-radical initiator, emulsifying agent, chain transfer agent, etc., in respective amounts in the ranges specified above, at a polymerization temperature of from 5° to 100° C., preferably from 50° to 90° C., for 0.1 to 10 hours. The emulsion polymerization can be initiated by adding a vinyl monomer and the free-radical initiator to an emulsion containing the colloidal silica-core silicone-shell particles.

The introduction of the vinyl monomer into the reactor in the polymerization step can be conducted at a time, portion-wise or continuously, or a combination thereof can be used. The polymerization product is coagulated by the conventional salt coagulation method, and the resulting powder is purified by water-washing and then drying, thereby producing a thermoplastic resin of the present invention.

The thus-obtained thermoplastic resin of the present invention, which contains the graft copolymer described above, can be pelletized with a kneading machine such as an extruder. In this step, other conventional polymers may suitably be blended with the thermoplastic resin, according to required performances, in an amount of generally about 99% by weight or less, preferably about 90% by weight or less, to give a thermoplastic resin composition. (Such a thermoplastic resin composition containing other polymer(s) in such an amount is hereinafter simply referred to as a "thermoplastic resin composition".)

Examples of such polymers include diene-based rubbers such as polybutadiene, butadiene-styrene copolymers, acrylonitrile-butadiene copolymers, polyisoprene, and natural rubber; olefin-based rubbers such as acrylic rubbers, ethylene-propylene copolymers, ethylene-propylene-diene copolymers, chlorinated butyl rubbers, and chlorinated polyethylene; aromatic vinyl-conjugated diene block copolymers such as styrene-butadiene block copolymers, styrene-butadiene-styrene block copolymers, and styrene-butadiene-styrene radial teleblock copolymers; hydrogenated products of the above block copolymers; and other polymers including polypropylene, polyethylene, polystyrene, styrene-acrylonitrile copolymers, high-impact polystyrene (HIPS), acrylonitrile-butadiene-styrene resins (ABS resins), acrylonitrile-ethylenepropylene-styrene resins (AES resins), methyl methacrylate-butadiene-styrene resins (MBS resins), acrylonitrile-butadiene-methyl methacrylate-styrene resins, acrylonitrile-n-butyl acrylate-styrene resins (AAS resins), poly(vinyl chloride), polycarbonates, poly(ethylene terephthalate), poly(butylene terephthalate), polyacetals, polyamides, epoxy resins, poly(vinylidene fluoride), polysulfone, ethylene-vinyl acetate copolymers, PPS resins, polyetheretherketones, PPO resins, styrene-methyl methacrylate copolymers, styrene-maleic anhydride copolymers, rubber-modified PPO resins, styrene-maleimide copolymers, rubber-modified styrene-maleimide copolymers, polyamide-based elastomers, and polyester-based elastomers.

The pelletized thermoplastic resin (composition) is suitably processed and shaped by ordinary techniques such as compression molding, injection molding, etc.

The thermoplastic resin in accordance with the present invention contains a graft copolymer obtained by graft-polymerizing a vinyl monomer onto colloidal silica-core silicone-shell particles each having a structure such that the core which is a colloidal silica particle is covered with the shell composed of a reactive unsaturated group-containing organosiloxy group or polyorganosiloxane through siloxane bond. That is, the silicone shells containing reactive unsaturated groups easily graft-polymerize with the vinyl monomer to provide the graft copolymer having a high graft ratio, so that the reinforcing effect and other effects of the colloidal silica particles are effectively produced. Therefore, this graft copolymer per se or its blends with other thermoplastic resins can show excellent impact strength, sliding property, weatherability, etc., and hence are not only usable for producing various molded articles, interior or exterior automotive trim parts, electrical or electronic parts, building materials, etc., but also applicable to coating compositions and the like.

The graft copolymer can be easily obtained by graft-polymerizing a vinyl monomer onto core-shell particles in an emulsion containing the core-shell particles, each core-shell particle comprising a core which is a colloidal silica particle and a shell composed of an organosiloxy group or polyorganosiloxane containing a reactive unsaturated group.

The present invention will be explained in more detail by reference to the following examples, which should not be construed to be limiting the scope of the invention. In these examples, all parts and percents are by weight unless otherwise indicated.

In the examples, various measurements and evaluations were made according to the following methods.

Graft ratio and degree of grafting were determined as follows. A certain weight (x) of the graft polymerization product was placed in acetone, and this mixture was shaken with a shaking machine for 2 hours to dissolve a free copolymer. The resulting mixture was subjected to centrifugal separation with a centrifuge at 23,000 rpm for 30 minutes, and the insoluble residue was separated. This residue was then dried at 120° C. for 1 hour in a vacuum dryer to obtain the weight (y) of the insoluble residue. Then, the graft ratio and degree of grafting were calculated using the following equations.

$$\text{Graft ratio (\%)} = \frac{(y - x) \times \text{(component (i) content in graft polymerization product)}}{(x) \times \text{(component (i) content in graft polymerization product)}} \times 100$$

$$\text{Degree of grafting (\%)} = \frac{(y) - (x) \times \text{(component (i) content in graft polymerization product)}}{(x) - (x) \times \text{(component (i) content in graft polymerization product)}} \times 100$$

Physical properties of thermoplastic resin compositions were evaluated according to the following methods.

Izod impact strength

ASTM-D256, ¼", 23° C., with notch
unit: kgf·cm/cm

Gloss

ASTM-D523, 45°
unit: %

Frictional property

Frictional property was evaluated by an abrasion test using a Suzuki-type thrust testing machine. As a material to which a test piece was rubbed, the same material as the test piece or a steel (S45C) was used. The test piece had been shaped into a hollow cylinder having an outer diameter of 25.6 mm and an inner diameter of 20.0 mm, and the material against which the test piece was rubbed had been shaped likewise. Dynamic coefficient of friction was measured in an atmosphere having a temperature of 23° C. and a humidity of 50% RH at a load of 5 kg and a running speed of 3.75 cm/sec.

The dynamic coefficient of friction was calculated using the following equation:

$$\mu = \frac{3 \times F \times (r_2^2 - r_1^2)}{P \times (r_2^3 - r_1^3)}$$

wherein $\mu$ is a dynamic coefficient of friction, F is a force applied to the load cell, P is a load, R is an arm length to the load cell, $r_1$ is an inner diameter, and $r_2$ is an outer diameter.

Specific abrasion loss was measured in an atmosphere having a temperature of 23° C. and a humidity of 50% RH. In the case where the test piece was rubbed against the same material, the measurement was made at a load of 5 kg and a running speed of 3.75 cm/sec for 12,600 revolutions (running distance 0.24 km). In the case where the test piece was rubbed against a steel (S45C), the measurement was made at a load of 10 kg and a running speed of 15 cm/sec for 80,000 revolutions (running distance 6 km).

The specific abrasion loss is calculated using the following equation:

$$A = \frac{\Delta W}{P \times l \times a}$$

wherein A is a specific abrasion loss, $\Delta W$ is a weight change of the sample, P is a load, l is a running distance, and $a$ is density of the sample.

Weatherability test

The sample was exposed for 200 hours (63° C., with rain) using a sunshine weatherometer (Model WE-USN-HC, manufactured by Toyo Rika Co., Ltd., Japan), and then its Izod impact strength and gloss were measured.

In addition to the above measurements, the average particle diameter of raw material colloidal silicas and colloidal silica-core silicone-shell particles was measured using a laser particle diameter-analyzing system LPA-3000S/3100 manufactured by Otsuka Electronics Co., Ltd., Japan, which is employed in the dynamic light-scattering method.

EXAMPLE 1

To a liquid mixture of 100 parts of an acidic colloidal silica, Snowtex OZL (manufactured by Nissan Chemical Industries, Ltd., Japan; average particle diameter 122 nm, $SiO_2$ 21.14%, $Na_2O$ 0.101%, pH 2.02; hereinafter referred to as "A-1"), 47 parts of distilled water, and 0.84 part of dodecylbenzenesulfonic acid was added a mixture of 0.32 part of p-vinylphenylmethyldimethoxysilane (hereinafter referred to as "b-1") and 21 parts of octamethylcyclotetrasiloxane (hereinafter referred to as "a-1"). The resulting mixture was prestirred with a homomixer and then passed twice through a homogenizer at a pressure of 300 kgf/cm$^2$ to emulsify and disperse the mixture.

The above-obtained emulsified dispersion was transferred to a separable flask equipped with a condenser, a nitrogen-introducing opening, and a stirrer. The dispersion was heated at 85° C. with stirring for 5 hours, and then cooled at 5° C. for 48 hours to complete condensation. Subsequently, the above-obtained polyorganosiloxane emulsion was neutralized with aqueous sodium carbonate solution to adjust the pH of the emulsion to 7. The conversion of octamethylcyclotetrasiloxane which had undergone condensation (hereinafter referred to as "conversion of a-1") in the thus-obtained polyorganosiloxane was 99.6%.

Upon particle diameter analysis based on the dynamic light-scattering method and examination with an electron microscope, the above-obtained polyorganosiloxane was ascertained to be colloidal silica-core silicone-shell particles (hereinafter referred to as "core-shell particle(s)"). That is, particle diameter analysis using a laser particle diameter-analyzing system (LPA-3000S/3100 manufactured by Otsuka Electronics Co., Ltd.) revealed that the monodisperse particle diameter curve attributable to the raw material colloidal silica and having a peak around 122 nm had disappeared completely and a monodisperse diameter curve having a peak around 175 nm had newly appeared. Further, as a result of examination with an electron microscope, silicone particle images only were observed, and images of the raw material silica particles were not observed at all.

Thereafter, the above-obtained core-shell particle emulsion was poured into a large amount of acetone to precipitate the core-shell particles. This precipitate was filtered off and then dried in a vacuum dryer at 50° C. for 12 hours, thereby obtaining agglomerates of core-shell particles. Elementary analysis, IR analysis, and $^1$H—, $^{13}$C—, and $^{29}$Si-NMR analysis of the above-obtained core-shell particle agglomerates revealed that the proportion of the silicone shell portion was 49.2% of the whole core-shell particles and the proportion of p-vinylphenyl groups in all the organic groups contained in the silicone shells was 0.27%.

The above-obtained colloidal silica-core silicone-shell particles were then subjected to graft copolymerization with vinyl monomers as follows.

35 Parts on a solid content basis of the above-obtained core-shell particle emulsion was mixed with 0.5 part of sodium dodecylbenzenesulfonate and 140 parts of distilled water. This mixture was transferred to a separable flask equipped with a dropping funnel, a condenser, a nitrogen-introducing opening, and a stirrer. To the flask were added 15.81 parts of styrene (hereinafter abbreviated as "ST"), which amount corresponds to 34% of the total styrene amount, 6.29 parts of acrylonitrile (hereinafter abbreviated as "AN"), which amount corresponds to 34% of the total acrylonitrile amount, 0.2 part of sodium ethylenediaminetetraacetate, 0.25 part of sodium formaldehyde sulfoxylate, 0.004 part of ferrous sulfate, and 0.074 part of cumene hydroperoxide. The resulting mixture was heated to 70° C. in a nitrogen stream. After polymerization was conducted for 1 hour, a liquid mixture composed of the remaining 30.69 parts of styrene, the remaining 12.21 parts of acrylonitrile, 1.084 parts of sodium dodecylbenzenesulfonate, 42 parts of distilled water, 0.12 part of cumene hydroperoxide, and 0.06 part of t-dodecyl mercaptan was added to the reaction mixture through the dropping funnel over a period of 3 hours. After completion of the addition, polymerization reaction was conducted for 1 hour, and then the reaction system was cooled.

The graft copolymer latex obtained by the above reaction was poured into warm water containing dissolved therein 2 parts of calcium chloride dihydrate, thereby conducting salting out and coagulation. Thereafter, the resulting thermoplastic resin containing a graft copolymer was separated, thoroughly washed with water and then dried at 80° C for 16 hours to complete purification.

The graft copolymer thus obtained was evaluated for graft ratio and degree of grafting. The results obtained are shown in Table 1.

57 Parts of the above-obtained thermoplastic resin powder was blended with 43 parts of a styrene-acrylonitrile copolymer (hereinafter referred to as "AS resin") obtained by the emulsion polymerization of styrene with acrylonitrile in a weight ratio of 75:25 in terms of the amounts of monomer charged, thereby preparing a thermoplastic resin composition. This thermoplastic resin composition was extruded into pellets by means of a twin-screw extruder at a cylinder temperature of 230° C.

The above-obtained thermoplastic resin composition in the form of pellets was molded into test pieces, which showed excellent weatherability, sliding property, impact resistance, and appearance as shown in Table 1.

EXAMPLES 2 AND 3

Polyorganosiloxane emulsions were prepared under the same conditions as in Example 1 except that the amounts of the acidic colloidal silica, distilled water, dodecylbenzenesulfonic acid, p-vinylphenylmethyldimethoxy-silane, and octamethylcyclotetrasiloxane were changed as shown in Table 1.

As a result of particle diameter analysis based on dynamic light-scattering and examination with an electron microscope, each of the above-obtained polyorganosiloxane emulsions in respective Examples was ascertained to be an emulsion of colloidal silica-core silicone-shell particles having a monodisper particle diameter distribution. The core-shell particles of each Example were evaluated in the same manner as in Example 1, and the results obtained are shown in Table 1.

Under the same conditions as in Example 1, the core-shell particles of each Example were subjected to graft copolymerization with vinyl monomers, and the resulting graft copolymer was blended with an AS resin to obtain a thermoplastic resin composition in the form of pellets.

For each Example, the graft ratio and degree of grafting of the graft copolymer and the physical properties of the thermoplastic resin composition were evaluated. The results obtained are shown in Table 1.

EXAMPLES 4 TO 6

Polyorganosiloxane emulsions were prepared under the same conditions as in Example 1 except that γ-methacryloxypropylmethyldimethoxysilane (hereinafter referred to as "b-2"), N-methacryloyl-N-methyl-γ-aminopropylmethyldimethoxysilane (hereinafter referred to as "b-3"), and vinylmethyldimethoxysilane (hereinafter referred to as "b-4") were used in Examples 4, 5, and 6, respectively, in respective amounts shown in Table 1.

As a result of particle diameter analysis based on dynamic light-scattering and examination with an electron microscope, the above-obtained polyorganosiloxanes in respective Examples were ascertained to be colloidal silica-core silicone-shell particles having a monodisperse particle diameter distribution.

The core-shell particles of each Example were evaluated in the same manner as in Example 1, and the results obtained are shown in Table 1.

Under the same conditions as in Example 1, the core-shell particles of each Example were subjected to graft copolymerization with vinyl monomers, and the resulting graft copolymer was blended with an AS resin to obtain a thermoplastic resin composition in the form of pellets.

For each Example, graft ratio and degree of grafting of the graft copolymer and the physical properties of the thermoplastic resin composition were evaluated. The results obtained are shown in Table 1.

EXAMPLE 7

A polyorganosiloxane emulsion was prepared under the same conditions as in Example 1 except that Snowtex OL (manufactured by Nissan Chemical Industries, Ltd.; average particle diameter 84 nm, $SiO_2$ 20.66%, $Na_2O$ 0.019%, pH 2.78; hereinafter referred to as "A-2") was used as an acidic colloidal silica.

As a result of particle diameter analysis based on dynamic light-scattering method and examination with an electron microscope, the above-obtained polyorganosiloxane was ascertained to be colloidal silica-core silicone-shell particles having a monodisperse particle diameter distribution. The core-shell particles were evaluated in the same manner as in Example 1, and the results obtained are shown in Table 1.

Under the same conditions as in Example 1, the core-shell particles obtained above were subjected to graft copolymerization with vinyl monomers, and the resulting graft copolymer was blended with an AS resin to obtain a thermoplastic resin composition in the form of pellets.

The graft ratio and degree of grafting of the graft copolymer and the physical properties of the thermoplastic resin composition were evaluated. The results obtained are shown in Table 1.

EXAMPLE 8

To a liquid mixture composed of 100 parts of an alkaline colloidal silica, Snowtex ZL (manufactured by Nissan Chemical Industries, Ltd.; average particle diameter 110 nm, $SiO_2$ 40.23%, $Na_2O$ 0.036%, pH 9.72; hereinafter referred to as "A-3"), 194 parts of distilled water, 6.5 parts of dioctadecyldimethylammonium chloride, and 1.5 parts of potassium hydroxide was added a mixture of 0.64 part of p-vinylphenylmethyldimethoxysilane and 42 parts of octamethylcyclotetrasiloxane. The resulting mixture was prestirred with a homomixer and then subjected twice to treatment with a homogenizer at a pressure of 300 kgf/cm² to emulsify and disperse the mixture.

The above-obtained emulsified dispersion was transferred to a separable flask equipped with a condenser, a nitrogen-introducing opening, and a stirrer. The dispersion was heated at 85° C. with stirring for 5 hours, and then cooled at 5° C. for 48 hours to complete condensation. Subsequently, the thus-obtained polyorganosiloxane emulsion was neutralized with hydrochloric acid to adjust the pH of the emulsion to 7. The conversion of octamethylcyclotetrasiloxane in the thus-obtained polyorganosiloxane was 97.9%.

As a result of particle diameter analysis based on dynamic light-scattering method and examination with an electron microscope, the above-obtained polyorganosiloxane was ascertained to be colloidal silica-core silicone-shell particles having a monodisperse particle diameter distribution. The core-shell particles were evaluated in the same manner as in Example 1, and the results obtained are shown in Table 1.

Under the same conditions as in Example 1, the core-shell particles obtained above were subjected to graft copolymerization with vinyl monomers, and the resulting graft copolymer was blended with an AS resin to obtain a thermoplastic resin composition in the form of pellets.

The percent graft ratio and degree of grafting of the graft copolymer and the physical properties of the thermoplastic resin composition were evaluated. The results obtained are shown in Table 1.

EXAMPLE 9

To a liquid mixture composed of 100 parts of an acidic colloidal silica, Snowtex 0 (manufactured by Nissan Chemical Industries, Ltd.; average particle diameter 31 nm, $SiO_2$ 20.53%, $Na_2O$ 0.034%, pH 2.58; hereinafter referred to as "A-4") and 0.43 part of dodecylbenzenesulfonic acid was added 0.32 part of p-vinylphenylmethyldimethoxysilane. The resulting mixture was prestirred with a homomixer and then subjected twice to treatment with a homogenizer at a pressure of 300 kgf/cm² to emulsify and disperse the mixture.

The above-obtained emulsified dispersion was transferred to a separable flask equipped with a condenser, a nitrogen-introducing opening, and a stirrer. The dispersion was heated at 85° C. with stirring for 5 hours, and then cooled at 5° C. for 24 hours to complete condensation. Subsequently, the resulting emulsion was neutralized with aqueous sodium carbonate solution to adjust the pH of the emulsion to 7. The thus-obtained emulsion had a solid content of 21.6%.

As a result of particle diameter analysis based on dynamic light-scattering method and examination with an electron microscope, the above-obtained polyorganosiloxane was ascertained to be colloidal silica-core silicone-shell particles having a monodisperse particle diameter distribution. The core-shell particles were evaluated in the same manner as in Example 1, and the results obtained are shown in Table 1.

Using the above-obtained core-shell particles composed mainly of colloidal silica particles, copolymerization with vinyl monomers was conducted under the same conditions as in Example 1. Through salting-out coagulation and purification, the copolymer formed was recovered in a recovery of 98.2%, which was calculated taking the conversions of the vinyl monomers charged into account. It was ascertained that most of the core-shell particles had been incorporated into the thus-obtained copolymer.

Under the same conditions as in Example 1, the above-obtained graft copolymer was blended with an AS resin to obtain a thermoplastic resin composition in the form of pellets.

The graft ratio and degree of grafting of the graft copolymer and the physical properties of the thermoplastic resin composition were evaluated. The results obtained are shown in Table 2. The above-obtained resin was a transparent resin because of the very small diameter of the core-shell particles.

EXAMPLES 10 TO 25

Thermoplastic resins (resin compositions) were obtained in the same manner as in Example 1 except that methyl methacrylate (hereinafter abbreviated as "MM"), N-phenylmaleimide (hereinafter abbreviated as "PMI"), glycidyl methacrylate (hereinafter abbreviated as "GM"), methacrylic acid (hereinafter abbreviated as "MA"), and 2-hydroxyethyl methacrylate (hereinafter abbreviated as "HEMA") were used in amounts shown in Tables 2 and 3 as vinyl monomers to be graft-polymerized, and that nylon-6, a poly(butylene terephthalate) resin (hereinafter abbreviated as "PBT"), a polycarbonate resin (hereinafter abbreviated as "PC"), a polystyrene resin (hereinafter abbreviated as "PS"), a poly(vinyl chloride) resin (hereinafter abbreviated as "PVC"), a polypropylene resin (hereinafter abbreviated as "PP"), a polyethylene resin (hereinafter abbreviated as "PE"), a polyacetal resin (hereinafter referred to as "POM"), a poly(vinylidene fluoride) resin (hereinafter abbreviated as "PVDF"), a poly(phenylene sulfide) resin (hereinafter abbreviated as "PPS"), a poly(phenylene oxide) resin (hereinafter abbreviated as "PPO"), and a polyester-ether-amide block copolymer (hereinafter abbreviated as PEA) were used in amounts shown in Tables 2 and 3 as thermoplastic resins with which graft copolymers were to be blended. With respect to each Example, the graft ratio and degree of grafting of the graft copolymer and the physical properties of the thermoplastic resin composition were evaluated. The results obtained are shown in Tables 2 and 3.

COMPARATIVE EXAMPLE 1

A polyorganosiloxane emulsion was prepared under the same conditions as in Example 1 except that p-vinylphenylmethyldimethoxysilane was not used.

As a result of particle diameter analysis based on dynamic light-scattering method and examination with an electron microscope, the above-obtained polyorganosiloxane was ascertained to be colloidal silica-core silicone-shell particles having a monodisperse particle diameter distribution. The core-shell particles thus obtained were evaluated in the same manner as in Example 1, and the results obtained are shown in Table 3.

Under the same conditions as in Example 1, the core-shell particles obtained above were subjected to graft copolymerization with vinyl monomers, and the resulting graft copolymer was blended with an AS resin to obtain a thermoplastic resin composition in the form of pellets.

The graft ratio and degree of grafting of the graft copolymer and the physical properties of the thermoplastic resin composition were evaluated. The results obtained are shown in Table 3.

COMPARATIVE EXAMPLE 2

The same colloidal silica as used in Example 9 was heat-treated and then cooled under the same conditions as in Example 9 except that p-vinylphenylmethyldimethoxysilane was not used.

Subsequently, the thus-treated colloidal silica was copolymerized with vinyl monomers under the same conditions as in Example 1. Through salting-out coagulation and purification, the resulting reaction product was recovered in a recovery of 48.6%, which was calculated taking the conversions of the vinyl monomers charged into account. It was ascertained that most of the colloidal silica particles remained unincorporated into the resin obtained.

COMPARATIVE EXAMPLE 3

A thermoplastic resin composition was obtained in the same manner as in Example 4 except that the component (A) used for preparing the core-shell emulsion in Example 4 was not used.

The physical properties of the thus-obtained thermoplastic resin composition were evaluated, and the results obtained are shown in Table 3. It can be seen that the composition obtained above is inferior in Izod impact strength to the composition of Example 4.

TABLE 1

| | | Example | | | | | | | | |
|---|---|---|---|---|---|---|---|---|---|---|
| | | 1 | 2 | 3 | 4 | 5 | 6 | 7 | 8 | 9 |
| Formulation for core-shell particle emulsion | | | | | | | | | | |
| Component (A) | (A-1) | 100 | 100 | 100 | 100 | 100 | 100 | | | |
| | (A-2) | | | | | | | 100 | | |
| | (A-3) | | | | | | | | 100 | |
| | (A-4) | | | | | | | | | 100 |
| Component (B) | (a-1) | 21 | 42 | 10.5 | 21 | 21 | 21 | 21 | 42 | — |
| | (b-1) | 0.32 | 0.63 | 0.16 | | | | | 0.64 | 0.32 |
| | (b-2) | | | | 0.32 | | | | | |
| | (b-3) | | | | | 0.32 | | | | |
| | (b-4) | | | | | | 0.32 | | | |
| Emulsifying agent 1 | | 0.84 | 1.26 | 0.63 | 0.84 | 0.84 | 0.84 | 0.84 | | 0.43 |
| Emulsifying agent 2 | | | | | | | | | 6.5 | |
| Distilled water | | 47 | 110 | 15 | 47 | 47 | 47 | 47 | 194 | |
| Potassium hydroxide | | | | | | | | | 1.5 | |
| Conversion of (a-1) (%) | | 99.6 | 99.7 | 99.6 | 98.9 | 99.3 | 99.7 | 99.8 | 97.9 | — |
| Properties of core-shell particles | | | | | | | | | | |
| Average particle diameter (nm) | | 175 | 184 | 157 | 175 | 176 | 176 | 155 | 173 | 33 |
| Particle diameter distribution | | | | | | Monodispersion | | | | |
| Shell content (%) | | 49.2 | 65.7 | 33.1 | 49.6 | 50.0 | 49.2 | 49.3 | 48.7 | 1.3 |
| Reactive unsaturated group content (%) | | 0.27 | 0.27 | 0.26 | 0.24 | 0.24 | 0.42 | 0.26 | 0.26 | 50.0 |
| Formulation for graft copolymer | | | | | | | | | | |

TABLE 1-continued

| | | Example | | | | | | | | |
|---|---|---|---|---|---|---|---|---|---|---|
| | | 1 | 2 | 3 | 4 | 5 | 6 | 7 | 8 | 9 |
| Core-shell particles | | 35 | 35 | 35 | 35 | 35 | 35 | 35 | 35 | 35 |
| Monomer | ST | 46.5 | 46.5 | 46.5 | 46.5 | 46.5 | 46.5 | 46.5 | 46.5 | 46.5 |
| | AN | 18.5 | 18.5 | 18.5 | 18.5 | 18.5 | 18.5 | 18.5 | 18.5 | 18.5 |
| | MM | | | | | | | | | |
| | GM | | | | | | | | | |
| | PMI | | | | | | | | | |
| | MA | | | | | | | | | |
| | HEMA | | | | | | | | | |
| Graft ratio (%) | | 102 | 104 | 98 | 100 | 89 | 25 | 105 | 102 | 110 |
| Degree of grafting (%) | | 55 | 56 | 53 | 54 | 48 | 13 | 57 | 55 | 59 |
| Formulation for thermoplastic resin composition | | | | | | | | | | |
| Graft copolymer | | 57 | 57 | 57 | 57 | 57 | 57 | 57 | 57 | 57 |
| AS resin | | 43 | 43 | 43 | 43 | 43 | 43 | 43 | 43 | 43 |
| Nylon-6 | | | | | | | | | | |
| PBT | | | | | | | | | | |
| PC | | | | | | | | | | |
| PS | | | | | | | | | | |
| PVC | | | | | | | | | | |
| PP | | | | | | | | | | |
| PE | | | | | | | | | | |
| POM | | | | | | | | | | |
| PVD | | | | | | | | | | |
| PPSF | | | | | | | | | | |
| PPO | | | | | | | | | | |
| PEA | | | | | | | | | | |
| Properties of thermoplastic resin composition | | | | | | | | | | |
| Izod impact strength | | 32.0 | 37.3 | 24.3 | 36.3 | 33.0 | 7.0 | 34.0 | 30.2 | 16.3 |
| Gloss | | 72 | 82 | 65 | 71 | 69 | 52 | 71 | 71 | 54 |
| Dynamic coefficient of friction | | 0.09 | 0.09 | 0.09 | 0.09 | 0.09 | 0.09 | 0.09 | 0.09 | 0.09 |
| Specific abrasion loss ($\times 10^{-3}$) | | 10 | 10 | 10 | 10 | 10 | 10 | 10 | 10 | 10 |
| Izod impact strength after weathering | | 32.0 | 37.0 | 24.1 | 36.2 | 32.9 | 6.9 | 33.9 | 30.1 | 16.2 |
| Gloss after weathering | | 71 | 80 | 64 | 70 | 68 | 51 | 70 | 70 | 52 |

TABLE 2

| | | Example | | | | | | | | |
|---|---|---|---|---|---|---|---|---|---|---|
| | | 10 | 11 | 12 | 13 | 14 | 15 | 16 | 17 | 18 |
| Formulaton for core-shell particle emulsion | | | | | | | | | | |
| Component (A) | (A-1) | 100 | 100 | 100 | 100 | 100 | 100 | 100 | 100 | 100 |
| | (A-2) | | | | | | | | | |
| | (A-3) | | | | | | | | | |
| | (A-4) | | | | | | | | | |
| Component (B) | (a-1) | 21 | 21 | 21 | 21 | 21 | 21 | 21 | 21 | 21 |
| | (b-1) | 0.32 | 0.32 | 0.32 | 0.32 | 0.32 | 0.32 | 0.32 | 0.32 | 0.32 |
| | (b-2) | | | | | | | | | |
| | (b-3) | | | | | | | | | |
| | (b-4) | | | | | | | | | |
| Emulsifying agent 1 | | 0.84 | 0.84 | 0.84 | 0.84 | 0.84 | 0.84 | 0.84 | 0.84 | 0.84 |
| Emulsifying agent 2 | | | | | | | | | | |
| Distilled water | | 47 | 47 | 47 | 47 | 47 | 47 | 47 | 47 | 47 |
| Potassium hydroxide | | | | | | | | | | |
| Conversion of (a-1) (%) | | 99.6 | 99.6 | 99.6 | 99.6 | 99.6 | 99.6 | 99.6 | 99.6 | 99.6 |
| Properties of core-shell particles | | | | | | | | | | |
| Average particle diameter (nm) | | 175 | 175 | 175 | 175 | 175 | 175 | 175 | 175 | 175 |
| Particle diameter distribution | | | | | | Monodispersion | | | | |
| Shell content (%) | | 49.2 | 49.2 | 49.2 | 49.2 | 49.2 | 49.2 | 49.2 | 49.2 | 49.2 |
| Reactive unsaturated group content (%) | | 0.27 | 0.27 | 0.27 | 0.27 | 0.27 | 0.27 | 0.27 | 0.27 | 0.27 |
| Formulation for graft copolymer | | | | | | | | | | |
| Core-shell particles | | 35 | 20 | 20 | 35 | 35 | 40 | 60 | 40 | 40 |
| Monomer | ST | 46.5 | | 33.6 | 45 | 45 | 60 | 20 | 60 | 60 |
| | AN | 18.5 | | | 18.5 | 18.5 | | | | |
| | MM | | 80 | | | | | 20 | | |
| | GM | | | | 1.5 | 1.5 | | | | |
| | PMI | | | 46.4 | | | | | | |
| | MA | | | | | | | | | |
| | HEMA | | | | | | | | | |

TABLE 2-continued

| | Example | | | | | | | | |
|---|---|---|---|---|---|---|---|---|---|
| | 10 | 11 | 12 | 13 | 14 | 15 | 16 | 17 | 18 |
| Graft ratio (%) | 102 | 100 | 89 | 100 | 100 | 112 | 58 | 112 | 112 |
| Degree of grafting (%) | 55 | 54 | 48 | 54 | 54 | 75 | 88 | 75 | 75 |
| Formulation for thermoplastic resin composition | | | | | | | | | |
| Graft copolymer | 57 | 100 | 100 | 57 | 57 | 50 | 10 | 20 | 20 |
| AS resin | | | | | | | | | |
| Nylon-6 | | | | 43 | | | | | |
| PBT | | | | | 43 | | | | |
| PC | 43 | | | | | | | | |
| PS | | | | | | 50 | | | |
| PVC | | | | | | | 90 | | |
| PP | | | | | | | | 80 | |
| PE | | | | | | | | | 80 |
| POM | | | | | | | | | |
| PVD | | | | | | | | | |
| PPSF | | | | | | | | | |
| PPO | | | | | | | | | |
| PEA | | | | | | | | | |
| Properties of thermoplastic resin composition | | | | | | | | | |
| Izod impact strength | 45.0 | 20.2 | 10.3 | 42.3 | 38.9 | 17.1 | 32.5 | 7.8 | 6.3 |
| Gloss | 78 | 83 | 75 | 77 | 76 | 80 | 81 | 72 | 73 |
| Dynamic coefficient of friction | 0.09 | 0.09 | 0.09 | 0.09 | 0.09 | 0.09 | 0.11 | 0.10 | 0.10 |
| Specific abrasion loss ($\times 10^{-3}$) | 10 | 10 | 10 | 10 | 10 | 10 | 40 | 15 | 15 |
| Izod impact after weathering | 44.8 | 20.0 | 10.0 | 42.1 | 38.8 | 16.8 | 32.0 | 7.5 | 6.0 |
| Gloss after weathering | 76 | 81 | 74 | 75 | 75 | 77 | 77 | 68 | 68 |

TABLE 3

| | | Example | | | | | | | Comparative Example | | |
|---|---|---|---|---|---|---|---|---|---|---|---|
| | | 19 | 20 | 21 | 22 | 23 | 24 | 25 | 1 | 2 | 3 |
| Formulation for core-shell particle emulsion | | | | | | | | | | | |
| Component (A) | (A-1) | 100 | 100 | 100 | 100 | 100 | 100 | 100 | 100 | | |
| | (A-2) | | | | | | | | | | |
| | (A-3) | | | | | | | | | | |
| | (A-4) | | | | | | | | | 100 | |
| Component (B) | (a-1) | 21 | 21 | 21 | 231 | 21 | 21 | 21 | 21 | — | 99.73 |
| | (b-1) | 0.32 | 0.32 | 0.32 | 0.32 | 0.32 | 0.32 | 0.32 | | | |
| | (b-2) | | | | | | | | | | 0.27 |
| | (b-3) | | | | | | | | | | |
| | (b-4) | | | | | | | | | | |
| Emulsifying agent 1 | | 0.84 | 0.94 | 0.84 | 0.84 | 0.84 | 0.84 | 0.84 | 0.84 | 0.43 | 0.84 |
| Emulsifying agent 2 | | | | | | | | | | | |
| Distilled water | | 47 | 47 | 47 | 47 | 47 | 47 | 47 | 47 | | 47 |
| Potassium hydroxide | | | | | | | | | | | |
| Conversion of (a-1) (%) | | 99.6 | 99.6 | 99.6 | 99.6 | 99.6 | 99.6 | 99.6 | 99.5 | | 99.4 |
| Properties of core-shell particles | | | | | | | | | | | |
| Average particle diameter (nm) | | 175 | 175 | 175 | 175 | 175 | 175 | 175 | 177 | 30 | 230 |
| Particle diameter distribution | | | | | | Monodispersion | | | | | |
| Shell content (%) | | 49.2 | 49.2 | 49.2 | 49.2 | 49.2 | 49.2 | 49.2 | 49.3 | — | 100 |
| Reactive unsaturated group content (%) | | 0.27 | 0.27 | 0.27 | 0.27 | 0.27 | 0.27 | 0.27 | — | — | 0.27 |
| Formulation for graft copolymer | | | | | | | | | | | |
| Core-shell particles | | 60 | 60 | 40 | 60 | 40 | 40 | 40 | 35 | 35 | 35 |
| Monomer | ST | 39 | 39 | | 39 | 60 | 37 | 37 | 36.5 | 46.5 | 46.5 |
| | AN | | | | | | 20 | 20 | 18.5 | 18.5 | 18.5 |
| | MM | | | 60 | | | | | | | |
| | GM | 1 | 1 | | 1 | | | | | | |
| | PMI | | | 46.4 | | | | | | | |
| | MA | | | | | | | 3 | | | |
| | HEMA | | | | | | 3 | | | | |
| Graft ratio (%) | | 58 | 58 | 105 | 58 | 112 | 108 | 018 | 3 | — | 100 |
| Degree of grafting (%) | | 88 | 88 | 70 | 88 | 75 | 72 | 72 | 2 | — | 54 |
| Formulation for thermoplastic resin composition | | | | | | | | | | | |

TABLE 3-continued

|  | Example | | | | | | | Comparative Example | | |
| --- | --- | --- | --- | --- | --- | --- | --- | --- | --- | --- |
|  | 19 | 20 | 21 | 22 | 23 | 24 | 25 | 1 | 2 | 3 |
| Graft copolymr | 10 | 40 | 50 | 30 | 50 | 50 | 50 | 57 | 57 | 57 |
| AS resin |  |  |  |  |  | 20 | 20 | 43 | 43 | 43 |
| Nylon-6 |  |  |  |  |  |  |  |  |  |  |
| PBT |  |  |  |  |  |  |  |  |  |  |
| PC |  |  |  |  |  |  |  |  |  |  |
| PS |  |  |  |  |  |  |  |  |  |  |
| PVC |  |  |  |  |  |  |  |  |  |  |
| PP |  |  |  |  |  |  |  |  |  |  |
| PE |  |  |  |  |  |  |  |  |  |  |
| POM | 90 | 60 |  |  |  |  |  |  |  |  |
| PVD |  |  | 50 |  |  |  |  |  |  |  |
| PPSF |  |  |  | 70 |  |  |  |  |  |  |
| PPO |  |  |  |  | 50 |  |  |  |  |  |
| PEA |  |  |  |  |  | 30 | 30 |  |  |  |
| Properties of thermoplastic resin composition |  |  |  |  |  |  |  |  |  |  |
| Izod impact strength | 10.7 | 14.9 | 35.4 | 12.6 | 22.0 | 23.1 | 21.2 | 4.0 | 3.5 | 25.0 |
| strength |  |  |  |  |  |  |  |  |  |  |
| Gloss | 77 | 78 | 85 | 78 | 79 | 80 | 81 | 42 | 45 | 69 |
| Dynamic coefficient of friction | 0.11 | 0.09 | 0.09 | 0.09 | 0.09 | 0.09 | 0.09 | 0.12 | 0.20 | 0.09 |
| Specific abrasion loss ($\times 10^{-3}$) | 15 | 10 | 10 | 10 | 10 | 10 | 10 | 31 | 35 | 10 |
| Izod impact strength after weathering | 10.0 | 14.0 | 35.0 | 12.0 | 21.1 | 22.5 | 20.8 | 3.0 | 3.0 | 24.0 |
| Gloss after weathering | 70 | 73 | 84 | 75 | 74 | 77 | 77 | 30 | 31 | 67 |

As described above, the thermoplastic resin of the present invention contains a graft copolymer obtained by graft-polymerizing a vinyl monomer onto colloidal silica-core silicone-shell particles each having a structure such that the shell made of a polyorganosiloxane covers the core of a colloidal silica particle through siloxane bond. Therefore, the colloidal silica particles can fully exhibit their reinforcing effect. Further, due to the reactive unsaturated groups bonded to the siloxane side chains in the silicone shells, the graft copolymer formed by the graft polymerization of the core-shell particles with other organic monomers can have a higher graft ratio.

In addition, according to the present invention, in the case where a polymer inherently having poor compatibility with colloidal silicas and/or polyorganosiloxanes is modified with the colloidal silica-core silicone-shell particles described above, the core-shell particles can be made compatible with such a polymer by graft-polymerizing onto the particles a monomer which gives a polymer having compatibility with the polymer to be modified by blending. Thus, it becomes possible to obtain thermoplastic resin compositions having newly imparted properties. This means that properties of colloidal silica particles and/or polyorganosiloxanes can be imparted to other polymers, and as a result, polymers having improved impact strength, sliding property, weatherability, and other properties can be obtained.

Furthermore, the thermoplastic resin of the present invention is advantageous in that the graft copolymerization of the desired monomer(s) with the colloidal silica-core silicone-shell particles can be conducted easily and efficiently. In view of the above-described advantages, it is apparent that the present invention greatly contributes to the polymer alloy technology and, hence, is of considerable industrial significance.

While the invention has been described in detail and with reference to specific embodiments thereof, it will be apparent to one skilled in the art that various changes and modifications can be made therein without departing from the spirit and scope thereof.

What is claimed is:

1. A thermoplastic resin containing a graft copolymer having a graft ratio of about 5% by weight or higher obtained by graft-polymerizing at least one vinyl monomer onto silica-core silicone-shell particles having an average particle diameter of from 4 to 400 nm comprising (A) from 99.9 to 5% by weight of cores which are colloidal silica particles and
   (B) from 0.1 to 95% by weight of shells comprising an organosiloxy group represented by the formula

$$R^1_p(QO)_qSiO_{(4-p-q)/2}- \qquad (I)$$

wherein $R^1$ which may be the same or different each represents a substituted or unsubstituted monovalent hydocarbon group having 1 to 8 carbon atoms, Q represents hydrogen atom or an alkyl group having 1 to 6 carbon atoms, p is an integer of 1 to 3, and q is an integer of 0 to 2, with proviso that (p+q) is an integer of 1 to 3, and a polyorganosiloxane represented by the average composition formula

$$R^2_2SiO \qquad (II)$$

wherein $R^2$ which may be the same or different each represents a substituted or unsubstituted monovalent hydrocarbon group having 1 to 8 carbons atoms, wherein 0.02 to 100 mole % of the sum of $R^1$ and $R^2$ are groups containing a reactive unsaturated group.

2. The thermoplastic resin as claimed in claim 1, wherein the cores of said core-shell particles are a dispersion in water of silica particles.

3. The thermoplastic resin as claimed in claim 1, wherein the shell of said core-shell particles is a polyorganosiloxane comprising a condensate of an organosilicon compound (a) represented by the formula $$R^3{}_b\text{Si}(OR^4)_{4-b} \quad (III)$$

wherein $R^3$ which may be the same or different each represents a substituted or unsubstituted monovalent hydrocarbon group having 1 to 8 carbon atoms, $R^4$ represents an alkyl group having 1 to 6 carbon atoms, and b is an integer of 1 to 3, and a polyorganosiloxane having 2 to 10 silicon atoms and not having a hydroxyl group, containing a structural unit represented by the average composition formula $$R^5{}_2\text{SiO} \quad (IV)$$

wherein $R^5$ which may be the same or different each represents a substituted or unsubstituted monovalent hydrocarbon group, wherein 0.02 to 100 mol % of the sum of $R^3$ and $R^5$ are groups containing a reactive unsaturated group.

4. A process for producing a thermoplastic resin, which comprises graft-polymerizing at least one vinyl monomer onto silica-core silicone-shell particles comprising (A) from 99.9 to 5% by weight of cores which are colloidal silica particles, and (B) from 0.1 to 95% by weight of a shell comprising an organosiloxy group represented by the formula $$R^1{}_p(QO)_q\text{SiO}_{\frac{4-p-q}{2}}- \quad (I)$$

wherein $R^1$ which may be the same or different each represents a substituted or unsubstituted monovalent hydrocarbon group having 1 to 8 carbon atoms, Q represents hydrogen atom or an alkyl group having 1 to 6 carbon atoms, p is an integer of 1 to 3, and q is an integer of 0 to 2, with proviso that (p+q) is an integer of 1 to 3, and a polyorganosiloxane represented by the average composition formula $$R^2{}_a\text{SiO}_{(4-a)/2} \quad (II)$$

wherein $R^2$ which may be the same or different each represents a substituted or unsubstituted monovalent hydrocarbon group having 1 to 8 carbon atoms and a is substantially 2 wherein 0.02 to 100 mole% of the sum of $R^1$ and $R^2$ are groups containing a reactive unsaturated group, said graft polymerization being conducted in an emulsion containing the core-shell particles.

5. A process as claimed in claim 4, which comprises emulsifying (A) 100 parts by weight, on a solid content basis, of a colloidal silica, (B) from 1 to 1,900 parts by weight of a mixture of an organosilicon compound (a) represented by the formula $$R^3{}_b\text{Si}(OR^4)_{4-b} \quad (III)$$

wherein $R^3$ which may be the same or different each represents a substituted or unsubstituted monovalent hydrocarbon group having 1 to 8 carbon atoms, $R^4$ represents an alkyl group having 1 to 6 carbon atoms, and b is an integer of 1 to 3 and a polyorganosiloxane (b) containing a structural unit represented by the average composition formula $$R^5{}_c\text{SiO}_{\frac{4-c}{2}} \quad (IV)$$

wherein $R^5$ which may be the same or different each represents a substituted or unsubstituted monovalent hydrocarbon group having 1 to 8 carbon atoms and c is substantially 2 containing no hydroxyl group, and having 2 to 10 silicon atoms, wherein 0.02 to 100 mole% of the sum of $R^3$ and $R^5$ are groups containing a reactive unsaturated group, (C) from 0.1 to 5 parts by weight of an emulsifying agent per 100 parts by weight of the sum of components (A) and (B) above, and (D) from 100 to 500 parts by weight of water per 100 parts by weight of the sum of components (A) and (B) above, and simultaneously conducting copolycondensation reaction of a hydrolyzed product of the organosilicon compound (a) and the polyorganosiloxane (b).

6. A process as claimed in claim 4, wherein the colloidal silica particles are in the form of a dispersion in water of colloidal silica particles.

* * * * *